Patented Oct. 8, 1940

2,217,569

UNITED STATES PATENT OFFICE 2,217,569

PROCESS FOR THE PRODUCTION OF METALLIC IRON POWDER

Walter Stephan, Frankfort-on-the-Main, Germany, assignor, by mesne assignments, to Chemical Marketing Company Inc., New York, N. Y.

No Drawing. Application September 6, 1938, Serial No. 228,695. In Germany September 23, 1937

6 Claims. (Cl. 75—34)

This invention relates to a process for the manufacture of metallic iron powder, which possesses the desirable qualities of a great fineness of the particles, a high capacity of reaction and a light bulk density gravity. This process consists in moistening iron in a pulverised form with water in the presence of small quantities of iron halides, particularly ferrous chloride, oxidising such product by the action of air, but avoiding an unfavorable rise of temperature of reaction and then reducing the oxide of iron which still may contain small quantities of iron hydroxide with hydrogen at 500–600° C.

In many cases it was found useful to heat the product prior to reduction to temperatures between 250° C.–350° C. under access of air in order to decompose iron hydroxide formed to a great extent and to oxidise metallic iron which eventually was not yet attacked or ferric oxide ($Fe_3O_4$) difficult to reduce.

As starting material according to the desired grade of purity of the final material an iron of the corresponding purity is used. Pig iron which is brought to a fine state, advantageously pulverised in suitable mills, such as pan grinders, pug mills, etc., may be used, where no particular requirements are to be met concerning absence of arsen, phosphorus, sulfur and silicon. However, preferably electrolytic iron is used as starting material where absence of the above mentioned impurities is required.

When carrying out a process according to the invention care must be taken to have small quantities of iron halides, particularly ferrous chloride, in the metallic iron powder before oxidation takes place. This may be performed by adding ferrous chloride to the iron powder. According to another modification of the process the ferrous chloride may be produced in the iron powder during oxidation; this may be carried out by adding small quantities of ammonium chloride (approximately 2½% $NH_4Cl$) to the iron powder. The same effect may be produced by adding small quantities of hydrochloric acid to the water which is used for moistening the metallic powder.

When adding water to the iron powder the heat of oxidation may rise to such an extent that the iron powder starts glowing. At such high temperatures the iron powder agglomerates and becomes unsuitable for the further procedure of the process. The mass therefore is suitably kept at temperatures, where agglomeration and sintering does not yet take place, but where, however, oxidation may be accomplished in an economic way. This may be achieved by regulating the access of water in a suitable way. When adding the water the pulverised mass is kept in motion by turning over, stirring and the like, thus regulating the temperatures to a certain extent. Temperatures, at which the water added evaporates very rapidly, at which sintering and agglomeration, however, does not yet occur, were found the most suitable ones, for instance, temperatures in the range between 120–200° C. The iron oxide, respectively the hydrous iron oxide, which is produced from the pulverised iron in the above described manner may be subjected to a second oxidation. This oxidation may be carried out in a revolving furnace, preferably passing air through it, at temperatures of about 250° C. to 350° C. Hereafter the material is reduced to metallic iron at about 500–600° C. This reduction is preferably carried out in muffles with a resting charge because otherwise the iron powder formed during the reaction with hydrogen would easily stick to the walls of the muffle furnace. Occasional stirring or shuffling of the mass helps to complete the reduction to metallic iron. Applying such treatment as described above an iron powder of a great fineness of particles and a high capacity of reaction as well as a light bulk density gravity may be produced, containing approximately 90–95% of metallic iron. If a higher content of iron is desired the pulverised mass may be subjected to a second oxidation after having cooled off and being mixed thoroughly.

Example 1

400 kg. of a pulverised electrolytic iron are mixed with 10 kg. of ammonium chloride and spread out on a device to which a stirring apparatus may be adapted. Gradually 300–500 kg. of water are added to it in a finely divided form, preferably sprayed, whilst the mass is stirred. The time of addition of water to the iron powder which is rotating slowly is regulated in such a way that it takes 20–30 hours during which the temperature is not allowed to rise too high. The length of time during which the water is added depends also in a certain degree on the atmospheric temperature. As soon as the reaction is over and the mass has accepted an evenly brownish-red colour, the oxidised powder is passed through the revolving furnace heated up to 250° C. to 350° C., through which a stream of air is blown. The mass is then spread out on metal sheets which are brought into a muffle furnace, where at 500–600° C. it is subjected to the reduction of hydrogen which is free from impairing impurities, such as $H_2S$, $AsH_3$, $PH_3$, etc. As soon as the reduction is finished, which may be detected by the absence of water in the stream of hydrogen flowing off, the mass is allowed to cool in the presence of the reducing gas. The mass consists approximately of 95% of metallic iron. If a higher percentage of iron is desired, the content of the muffles is turned over after cooling and thereafter subjected again to hydrogen gas at 500–600° C. The iron powder produced as specified in the foregoing example possesses an extremely great fineness of particles, a great power of reaction as well as a very light bulk density gravity. For example, after lighting the iron powder with a match it will go on burning up quite by itself.

*Example 2*

20 kg. of electrolytic iron are mixed with 0.5 kg. of ammonium bromide and subjected to oxidation in presence of 15–20 kg. of water according to Example 1 and further treated as shown above. The final product consists of an iron powder with a content of 98% of metallic iron.

What I claim is:

1. A process for the production of an iron powder of great fineness and power of reaction and of a very light bulk density gravity which comprises gradually adding water to pulverized iron in the presence of a relatively small quantity of iron halides over a period of time to moisten such powder, during such period of time subjecting the moistened powder to air at a temperature at which the added water rapidly evaporates but avoiding a rise in temperature sufficient to cause agglomeration of the reaction product and then reducing the product in the presence of hydrogen at 500° C. to 600° C.

2. A process in accordance with claim 1 which comprises in addition adding a relatively small quantity of a halide compound to the iron powder whereby the iron halides are produced during the moistening and oxidation of the iron powder.

3. A process in accordance with claim 1 which comprises in addition adding a relatively small quantity of a halogen acid to the water employed in moistening the iron powder to produce the iron halides.

4. A process for the production of an iron powder of great fineness and power of reaction and of a very light bulk density gravity which comprises gradually adding water to pulverized iron in the presence of a relatively small quantity of ammonium halides over a period of time to moisten such powder, during such period of time subjecting the moistened powder to air at a temperature at which the added water rapidly evaporates but avoiding a rise in temperature sufficient to cause agglomeration of the reaction product and then reducing the product in the presence of hydrogen at 500° C. to 600° C.

5. A process for the production of an iron powder of great fineness and power of reaction and of a very light bulk density gravity which comprises gradually adding water to pulverized iron in the presence of a relatively small quantity of iron halides over a period of time to moisten such powder, turning the moistened powder in the presence of air so that it has free access to air at a temperature between 120° C. and 200° C., and then reducing the product in the presence of hydrogen at 500° C. to 600° C.

6. A process for the production of an iron powder of great fineness and power of reaction and of a very light bulk density gravity which comprises gradually adding water to puverized iron in the presence of a relatively small quantity of iron halides over a period of time to moisten such powder, turning the moistened powder in the presence of air so that it has free access to air at a temperature between 120° C. and 200° C., then heating the product in the presence of air at temperatures between 250° C. and 350° C. to oxidize the product further, and then reducing the product in the presence of hydrogen at 500° C. to 600° C.

WALTER STEPHAN.